INVENTORS
ROBERT W. LEMON,
BY GLEN L. BOWEN, &
JULIUS A. CLAUSS, JR

ATTORNEYS

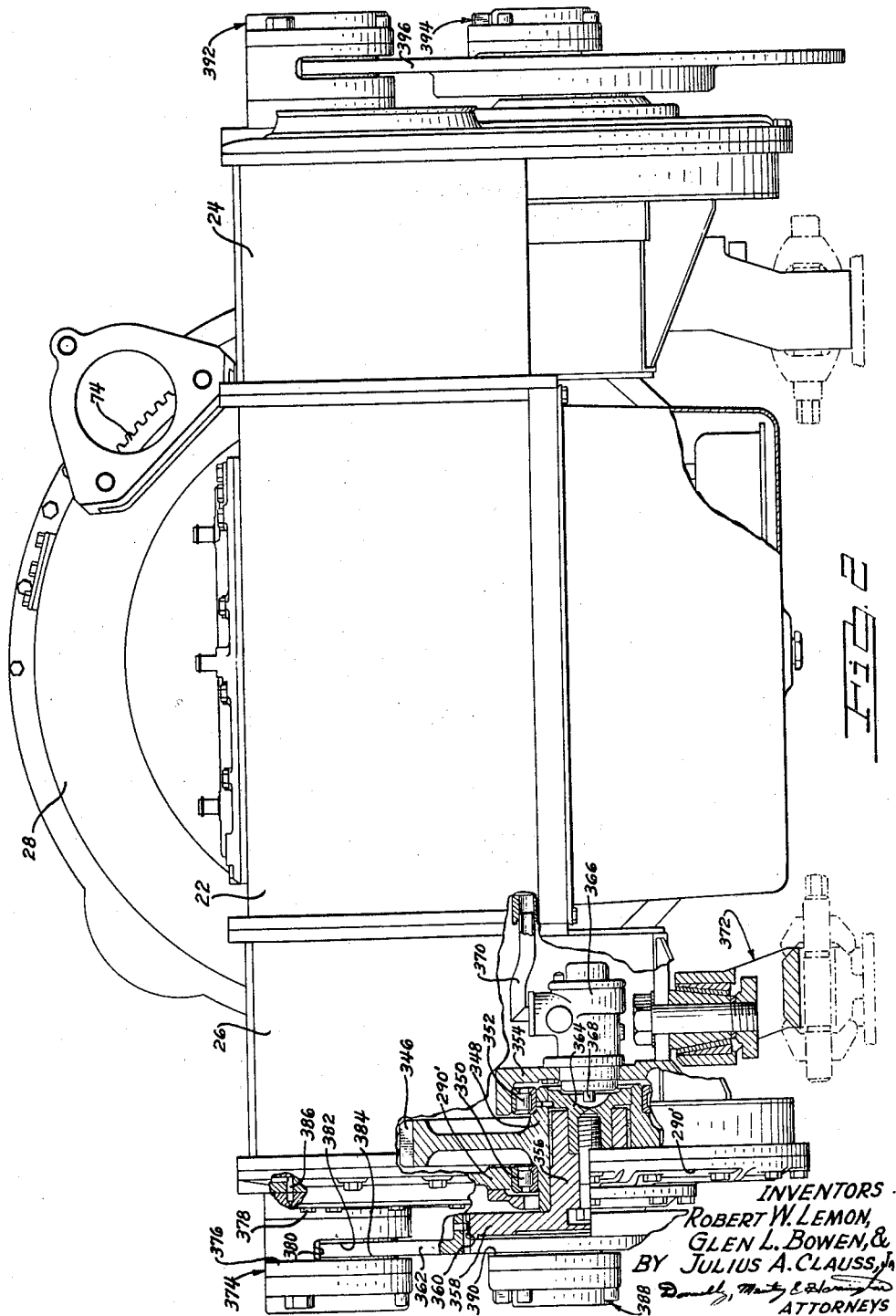

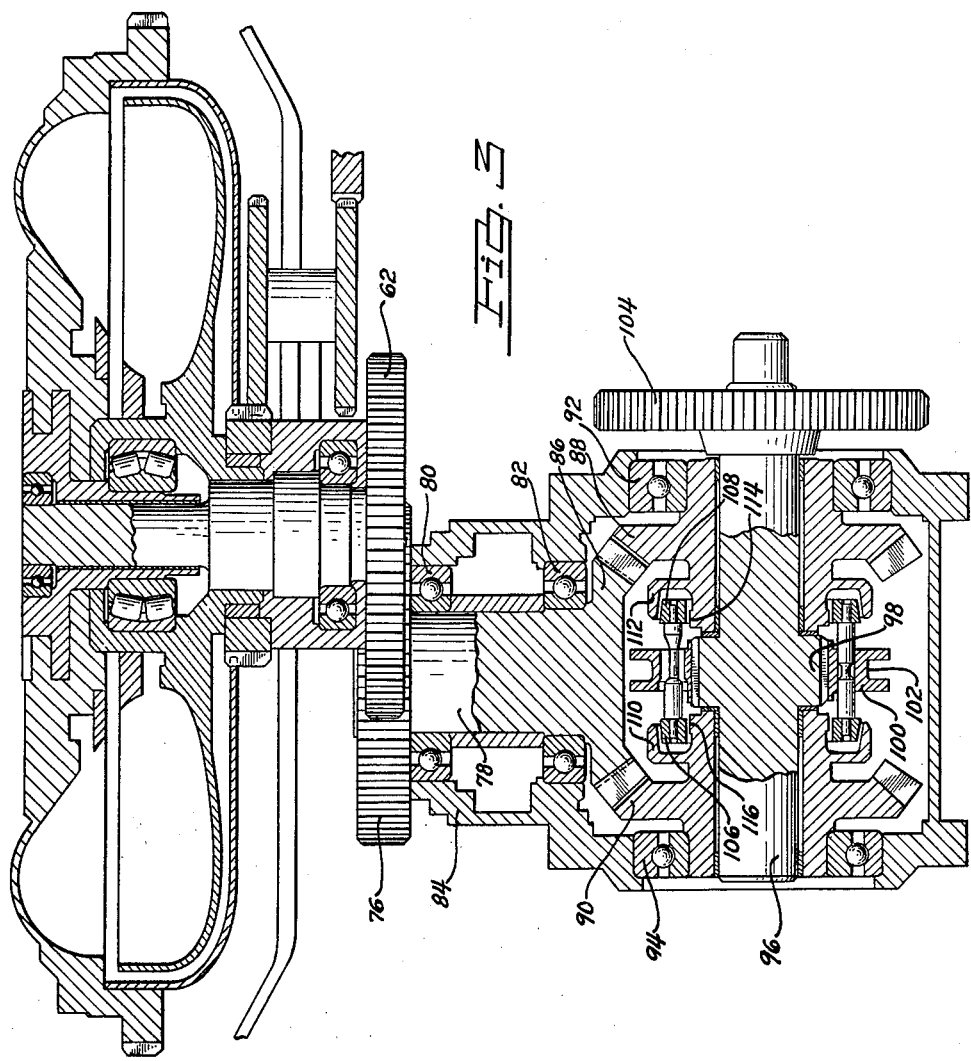

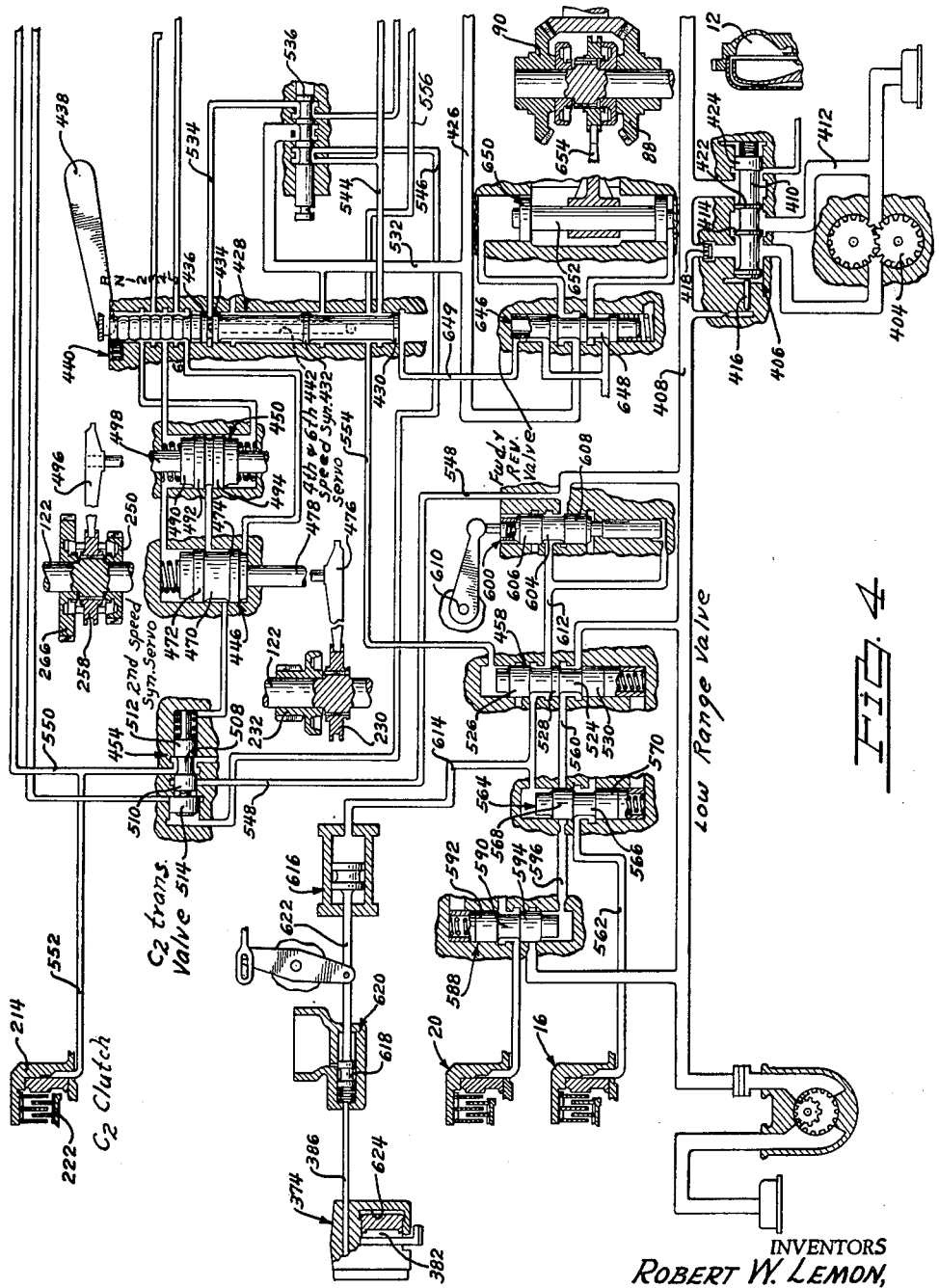

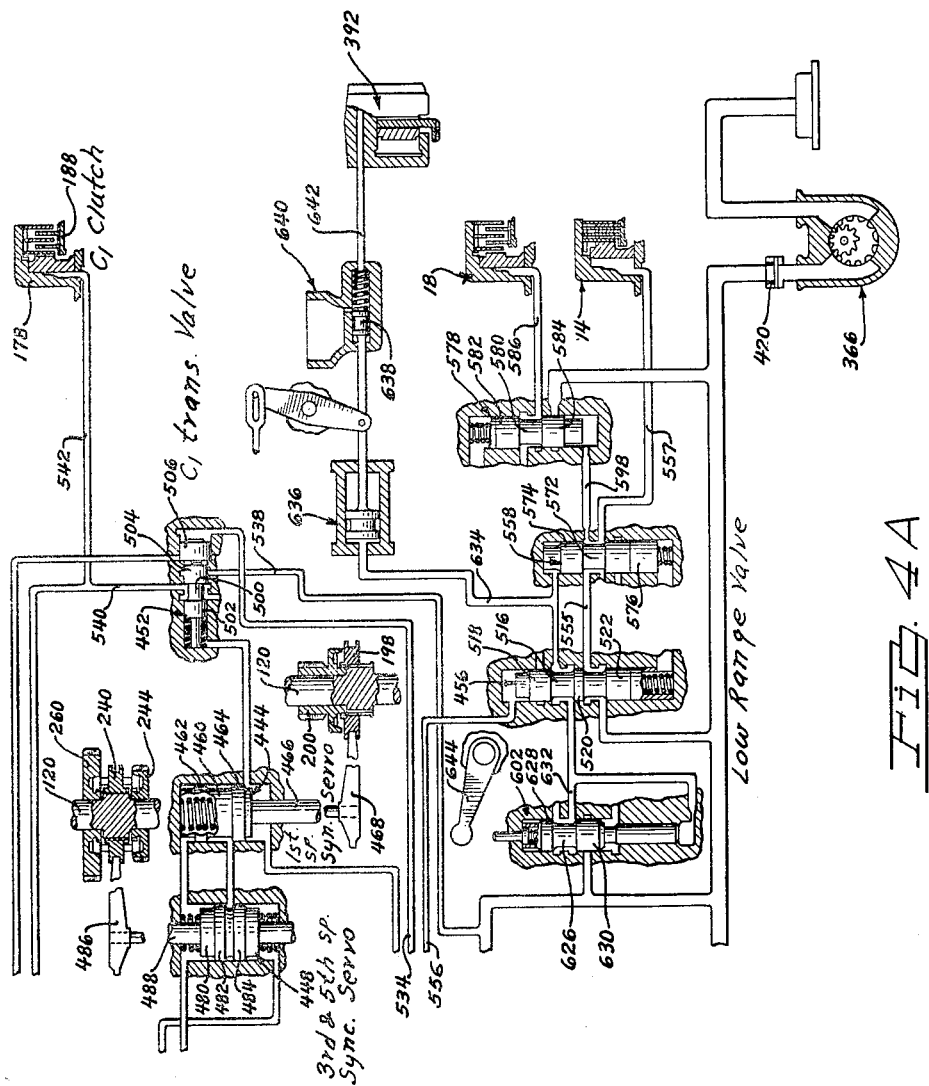

United States Patent Office 3,194,373
Patented July 13, 1965

3,194,373
CONTROL SYSTEM FOR A MULTIPLE SPEED POWER TRANSMISSION
Glen L. Bowen, Detroit, Robert W. Lemon, Farmington, and Julius A. Clauss, Jr., Beverly Hills, Mich., assignors to Jered Industries, Inc., Birmingham, Mich., a corporation of Michigan
Original application Oct. 29, 1958, Ser. No. 770,502, now Patent No. 3,050,164, dated Aug. 21, 1962. Divided and this application Aug. 20, 1962, Ser. No. 217,864
6 Claims. (Cl. 192—87)

This application forms a division of our application Serial No. 770,502, filed October 29, 1958, now Patent No. 3,050,164, issued August 21, 1962.

Our invention relates generally to controls for a multiple speed ratio power transmission mechanism that are capable of conditioning the transmission mechanism for operation in any one of several speed ratios.

It is an object of our invention to provide a control system for use with a multiple speed ratio power transmission when a shift from one ratio to another can be accomplished while the transmission is delivering power merely by disengaging one coupling member and engaging another in sequence.

It is another object of our invention to provide controls for a multiple speed power transmission mechanism having dual power delivery path, each path being capable of providing multiple torque ratios, wherein one path can be conditioned for torque delivery while the total power is being transferred through the other and wherein the other path can be conditioned for torque delivery at another ratio while the total power is being transferred through the one path.

It is a further object of our invention to provide a vehicle transmission control system that comprises a pair of steering clutches and a steering brake at each of two power output members wherein the degree of engagement of the clutches and brakes can be varied to permit turning maneuvers of the vehicle at various turning radii.

Further objects and features of our invention will become apparent from the following description and from the accompanying drawings wherein:

FIG. 2 is a rear end view, partly in section, showing a portion of the steering mechanism associated with transmission structure of FIG. 1;

FIG. 3 is a cross sectional assembly view of a driving connection between the fluid coupling of the assembly of FIG. 1 and the main power input shaft for the main gear assembly;

FIGS. 4 and 4a show a schematic representation of the transmission control system and the associated controls for the clutch-brake and geared steering components.

Figure 1:
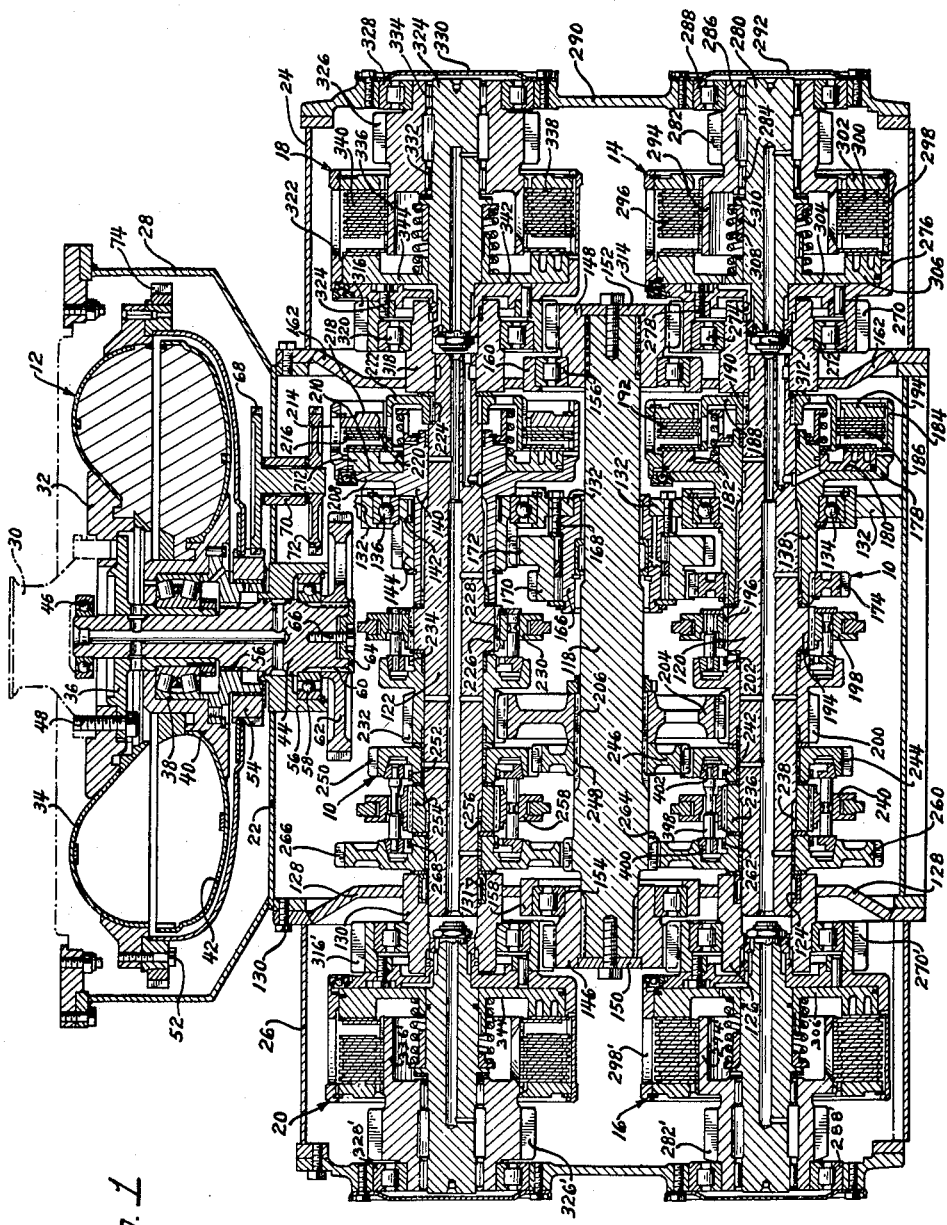
FIG. 1 is a cross sectional assembly view of our improved transmission structure.

Referring first to FIG. 1, the main gear assembly is generally identified by numeral 10, a fluid coupling is generally designated by numeral 12, low range steering clutches are generally designated by the numerals 14 and 16 and high range steering clutches are generally designated by numerals 18 and 20.

By preference, the transmission structure may be mounted in a vehicle with the axis of the clutches 14, 16, 18 and 20 disposed transversely with respect to the center line of the vehicle and with the fluid coupling 12 disposed in a forward location in driving relationship with an engine driven drive shaft. In such an arrangement, low speed range clutches 14 and 16 may be adapted to be selectively clutched to power absorbing members such as the vehicle traction wheels or tracks, and the clutches 18 and 20 may be similarly adapted to form a driving connection for operation in a relatively high speed range. The manner in which power is transferred from the engine through the coupling 12 and through the gear assembly 10 to the lower and high range clutches will become apparent from the following description.

Particular description of transmission assembly

The main gear assembly 10 is disposed within a main transmission housing identified by the numeral 22, and auxiliary housings are situated on either side of the housing 22 as shown at 24 and 26, the housing 24 enclosing clutches 14 and 18 and the housing 26 enclosing clutches 16 and 20. The fluid coupling 12 is enclosed by a suitable housing 28 as indicated.

An engine driven drive shaft is represented in FIG. 1 at 30 and it is drivably connected to a hub 32 which forms a part of a hydrokinetic pump member 34. The hub 32 includes an adapter 36 extending axially with respect to the pump member 34 and it is journalled in a roller bearing assembly 38. Bearing assembly 38 is disposed in a recess formed in a hub 40 for a hydrokinetic turbine member 42 of coupling 12. Adapter 38 is also concentrically disposed about a power delivery shaft 44, and one end of the shaft 44 is journalled by means of a bearing 46 in a pilot opening formed in the end of the drive shaft 30.

The pump member 34 and the turbine member 32 are each provided with a plurality of flow directing vanes disposed in juxtaposed relationship and the vanes of each member are confined in a cooperating outer shroud, the latter defining the boundaries of a toroidal fluid flow circuit.

The pump member 34 may be drivably connected to a power input drive shaft 30 by suitable bolts 48 which extend through hub 32 and the associated adapter 36. Additional support may be provided by a pump shell 50 which is secured to the outer periphery of the shroud for the pumping member 34 by suitable bolts 52, the pump shroud and the pump shell 50 being provided with suitable peripheral flanges for this purpose. A radially inward extremity of the pump shell 50 is connected to a bearing member 54 which in turn is journalled on a cooperating extension of the hub 40 of turbine member 42. The hub portion on which the bearing member 54 is journalled is in the form of an adapter which may be positively secured to turbine member 42 in a suitable fashion, such as by dowel pins or bolts, and which may be splined at 56 to provide a driving connection between the pump member 42 and the shaft 44, the shaft 44 being externally splined for this purpose.

The main housing 22 may be formed with a central aperture and a bearing retaining member 56 may be permanently situated therein as indicated. A ball bearing 58 is retained in bearing retaining member 56 for the purpose of journalling shaft 44. The end of shaft 44 is externally splined at 60 and an internally splined driving gear 62 is drivably carried on the end of shaft 44. A retainer 64 in the form of a washer is secured to the end of the shaft 44 by a bolt 66 in order to retain the gear 62 in place.

If desired, bearing member 44 may be formed with external gear teeth and an auxiliary driving gear 68 may be journalled in a suitable adapter 70 fixed in one portion of the housing 22. Gear 68 may be disposed in driving relationship with respect to a gear 72 which in turn may be utilized as an engine accessory drive or for driving an engine driven fluid pump for obtaining the control pressure necessary for use in energizing transmission control system. Also the above mentioned peripheral flange on the pump shell 50 may be utilized for the purpose of mounting an engine starter ring gear 74 in a conventional fashion.

Referring next to FIG. 3, we have illustrated in diagrammatic form a power delivery gear train capable of transferring power from a turbine member 32 to the power input gear element of the main gear assembly. This gear train comprises a gear 76 carried by a torque delivery shaft 78 which in turn is journalled by bearings 80 and 82 in a cooperating housing portion 84. A bevel gear 86 is drivably carried by the other end of shaft 78 and is disposed in driving engagement with cooperating bevel gears 88 and 90. Gear 88 is journalled by bearing 92 and gear 90 is journalled by gear 94, the bearings 92 and 94 being suitably positioned in bearing retaining apertures formed in housing portion 84. Gear 76 and the above mentioned gear 62 are disposed in continuous meshing engagement so that turbine torque is transferred directly from turbine member 42 of the coupling 12 to each of the bevelled gears 88 and 90. A shaft 96 is disposed in concentric relationship with respect to each of the gears 88 and 90, and suitable bushings are provided for accommodating relative rotation of gears 88 and 90 about shaft 96. An intermediate portion 98 of shaft 96 is externally splined and an internally splined synchronizer clutch sleeve element 100 is carried thereon as indicated. Element 100 is formed with a peripheral groove to accommodate shifter fingers carried by a conventional shifter fork, and the element 100 may be moved axially with respect to shaft 96 in this fashion.

A gear 104 is carried by shaft 96 and this gear is adapted to drivably engage a power input gear of the main transmission gear assembly which will be subsequently explained.

The synchronizer clutch sleeve element 100 forms a portion of a synchronizer assembly that also includes synchronizer clutch elements 106 and 108 which cooperate with conical clutch elements 110 and 112, respectively. Clutch elements 110 and 112 are in turn carried by bevel gears 90 and 88, respectively.

The hub portion of gears 88 and 90 are externally splined as shown at 114 and 116, and when synchronizer element 100 is adjusted in the left hand direction, as viewed in FIG. 3, the internal spline teeth thereof drivably engage splines 116 to establish a positive driving connection between gear 90 and shaft 96. Similarly when synchronizer element 100 is shifted in a right hand direction, the internal spline teeth on the element 100 drivably engage the external spline teeth 114 to establish a positive driving connection between gear 88 and shaft 96. The synchronizer element 100 and the synchronizer clutches 106 and 108 form a portion of a synchronizer assembly which is effective to provide a synchronized driving connection between shaft 96 and either of the gear elements 88 or 90, and this synchronized action will be explained with reference to FIG. 1.

Referring next to FIG. 1, a transmission power output shaft or mainshaft is shown at 118, and a pair of transmission counter shafts are shown at 120 and 122, said counter shafts being disposed at opposite sides of the power output shaft 118 in parallel relationship therewith. The left side of counter shaft 120, as viewed in FIG. 1, is journalled by means of a bearing 124 within a bearing adapter 126. The adapter 126 in turn is permanently secured to an end wall 128 which forms a portion of the above mentioned auxiliary housing 26. The housing 26, including wall 128, may be secured in a permanent fashion to main housing 22 by bolts 130, suitable cooperating flanges being formed on main housing 22 and auxiliary housing 26 for this purpose.

In a similar fashion counter shaft 122 is also journalled within a bearing adapter 130 by suitable bearings 131, and the adapter 130 may in turn be permanently secured in a cooperating aperture formed in end wall 128.

The main housing 22 is also formed with an intermediate supporting wall 132, and this wall 132 is centrally apertured at two spaced locations to accommodate a first ball bearing 134 and a second ball bearing 136. The bearing 134 is adapted to rotatably journal a sleeve shaft 138, and counter shaft 120 is positioned within sleeve shaft 138 and journalled therein by suitable bushings as indicated. In a similar fashion a sleeve shaft 140 is concentrically disposed about the right hand end of counter shaft 142, as viewed in FIG. 1, and suitable bushings are provided as indicated to accommodate relative rotation therebetween and to provide a support for the counter shaft 142. The sleeve shaft 140 is splined, as indicated at 142, to the internally splined hub of an external gear 144. The hub of gear 144 is in turn positioned in and supported by bearing 146. It is thus apparent that each of the counter shafts 120 and 122 are end supported and adapted for their rotation in their respective bearing supports.

The power output shaft or mainshaft 118 is externally splined at either end thereof to accommodate a driving connection with internally splined gears 146 and 148, the gear 146 being located at the left hand end of shaft 118 and the gear 148 at the right hand end thereof. Suitable retainers 150 and 152 are bolted or otherwise secured to the ends of shaft 118 for the purpose of securing in place gears 146 and 148, respectively.

Roller bearings 154 and 156 are positioned at either end of power output shaft 118 within bearing adapters 158 and 160, respectively. The adapters 158 and 160 are permanently secured in cooperating apertures formed in end housing walls 128 and 162, the latter wall forming a portion of aforementioned auxiliary housing 24. The housing 24, like the above described housing 26, may be secured to main housing 22 together with end wall 162 by suitable bolts 164, the main housing 22 and auxiliary housing 24 being formed with cooperating flanges for this purpose. It is therefore seen that power output shaft 118 is end supported for rotation about its axis by bearings 154 and 156.

Another bearing adapter is indicated in FIG. 1 by numeral 166 and it is secured to supporting wall 132 by means of bolts at 168. Adapter 166 supports a pair of coupled gears 170 and 172, and suitable bearings are provided as indicated to accommodate rotation of the gears 170 and 172 about the relatively stationary adapter 166.

The gear 172 functions as a power input gear element for the main transmission gear assembly and is in meshing engagement with the above mentioned gear 104 illustrated in FIG. 3. Gear 170 is in driving engagement with gear 174 which is positively splined at 176 to the aforementioned sleeve shaft 138. Shaft 138 is formed with a radial flange 178 which defines in part an annular cylinder 180 within which an annular piston 182 is slidably positioned.

A drum-like clutch member is formed at the radially outward extremity of flange 178, as shown at 184, and it is internally splined to provide a driving connection with cooperating externally splined clutch discs 186. Another clutch member 188 is positively splined at 190 to counter shaft 120 and it is externally splined to accommodate a driving connection with internally splined clutch discs 192. A clutch disc back-up member is shown at 194 and when fluid pressure is admitted in the working chamber defined by cylinder 180 and the cooperating annular piston 182, the clutch discs 186 and 192 are urged into frictional engagement thereby establishing a driving connection between sleeve shaft 138 and counter shaft 120.

An intermediate portion 194 of counter shaft 120 is externally splined as shown at 196, and synchronizer clutch element 198 is internally splined to facilitate a positive connection with counter shaft 120 and to accommodate relative axial movement therebetween.

A gear 200 is rotatably journalled by suitable bushings on counter shaft 120 and it is formed with external synchronized clutch teeth 202. Gear 200 is in driving engagement with gear 204 which in turn is positively connected to power output shaft 118 by means of a splined connection 206.

During operation of the transmission mechanism in the first speed ratio, the multiple clutch disc assembly 186 and 192 is energized and clutch element 198 is shifted in a left hand direction as viewed in FIG. 1, so that the internal splines thereof positively engage external clutch teeth 202. A positive driving connection is therefore established between power input gear 172 and power output shaft 118, the torque delivery path being defined by gear 170, gear 174, sleeve shaft 138 and clutch disc assembly 186 and 192, counter shaft 120, synchronizer clutch element 198, gear 200 and gear 204.

Gear 172, which is journalled about the axis of output shaft 118, is in driving engagement with gear 144 journalled for rotation about shaft 122. Sleeve shaft 140 is formed with a radial flange 208 which partly defines an annular cylinder 210 within which an annular piston 212 is slidably situated. A clutch member 214 is carried by the radially outward portion of flange 218 and it is internally splined to accommodate a driving connection with external splined clutch discs 216. Member 214 also has secured thereto a clutch disc back-up member 218. Cooperating clutch discs are identified by numeral 220 and they are internally splined to accommodate a driving connection with clutch member 222, the latter being positively connected to counter shaft 122 by means of a spline connection 224. It is thus apparent that when fluid pressure is admitted to the chamber defined by cylinder 210 and cooperating annular piston 212, the clutch discs 216 and 220 will be brought into frictional engagement thereby establishing a driving connection between gear 144 and counter shaft 122.

An intermediate portion 226 of counter shaft 122 is externally splined as indicated at 228 to accommodate a driving connection with a synchronizer clutch member 230. The clutch member 230 may be adjusted axially with respect to counter shaft 122 although the connection provided by spline 228 prevents relative rotation thereof with respect to counter shaft 122.

A gear 232 is rotatably journalled on counter shaft 122 by suitable bushings, and it is formed with an extension having external clutch teeth 234 disposed adjacent the splined counter shaft portion 226. When clutch element 230 is adjusted in a left hand direction, as viewed in FIG. 1, it will drivably engage clutch teeth 234 to establish a positive driving connection between counter shaft 122 and gear 232.

During operation of the transmission structure in a so-called second speed ratio, the clutch disc assembly 216 and 220 is engaged and the clutch element 230 is shifted in a left hand direction, as viewed in FIG. 1, to couple gear 232 with counter shaft 122. A torque delivery path between power input gear 144 and power output shaft 118 is therefore defined by sleeve shaft 140, the clutch disc assembly 216 and 220, counter shaft 122, clutch element 230, gear 232 and gear 204.

An externally splined clutch element 236 is mounted on counter shaft 120 in concentric relationship therewith and is positively connected thereto by means of a spline connection. A shiftable clutch element 240 is situated in engaged relationship with respect to clutch element 236 and it is formed with internal spline teeth which cooperate with external spline teeth on the element 236. Clutch 240 may be adjusted axially with respect to counter shaft 120, and when it is moved in a right hand direction, as viewed in FIG. 1, it drivably engages external clutch teeth 242 formed on the hub of a gear 244, the latter being rotatably journalled on counter shaft 120 by means of suitable bushings as indicated. Gear 244 is disposed in driving engagement with a gear 246 which in turn is positively connected to output shaft 118 by means of a suitable spline connection 248.

During operation of the transmission in the third speed ratio the clutch disc assembly 186 and 192 may be energized and the clutch element 240 may be shifted in a right hand direction, as viewed in FIG. 1, to effect a driving connection between counter shaft 120 and the gear 244. The clutch disc assembly 216 and 220 will be released during operation in the third speed ratio. A power delivery path between power input gear 172 and the power output shaft is therefore defined by gear 170, gear 174, sleeve shaft 138, clutch disc assembly 186 and 192, counter shaft 120, clutch elements 236 and 240 and gears 244 and 246.

A gear 250 is rotatably journalled on counter shaft 122 by means of suitable bushings and the hub thereof is formed with external clutch teeth 252. A spline clutch element 254 is situated adjacent gear 250 and is positively connected to counter shaft 122 by means of a spline connection 256. Another internally splined clutch element 258 is carried by clutch element 254, the latter having external splines which cooperate with the internal splines of clutch element 258 to permit relative axial adjustment of the latter. When clutch element 258 is adjusted in a right hand direction, as viewed in FIG. 1, the internal clutch teeth thereof engage clutch teeth 252 to establish a positive driving connection between gear 250 and counter shaft 122.

During operation in the fourth speed ratio, clutch disc assembly 216 and 220 is applied and clutch disc assembly 186 and 192 is released, and a power flow path between the power input gear 172 and power output shaft 118 is therefore defined by gear 170, gear 144, sleeve shaft 140, clutch disc assembly 216 and 220, counter shaft 122, clutch elements 254 and 258, gear 250 and gear 246.

A gear 260 is rotatably mounted by means of suitable bushings on counter shaft 120 adjacent clutch element 236 as indicated. The gears 200 and 244, the clutch element 236 and the gear 260 are disposed in axially stacked relationship between the intermediate portion 194 of counter shaft 120 and the bearing adapter 126 with suitable thrust washers therebetween. Axial displacement of these members relative to counter shaft 120 is therefore prevented.

The hub of gear 260 is also formed with external clutch teeth 262 which may be engaged by the internal spline teeth of clutch element 240 when the element 240 is shifted in a left hand direction, as viewed in FIG. 1. When the element 240 is shifted in this fashion, a direct drive connection is established between the gear 260 and counter shaft 120. The gear 260 is in driving engagement with a gear 264 formed on power output shaft 118.

During operation in the fifth speed ratio, the clutch element 240 assumes a left hand position and clutch disc assembly 216 and 220 is released while clutch disc assembly 186 and 192 is applied. The torque delivery path between power input gear 170 and the power output shaft 118 during operation in the fifth speed ratio is defined by gear 170, gear 174, sleeve shaft 138, clutch disc assembly 186 and 192, counter shaft 120, clutch elements 236 and 240 and gears 260 and 264.

A gear 266 is rotatably journalled on counter shaft 122 by suitable bushings and the hub thereof is also formed with external clutch teeth 268. The teeth 268 are adapted to be drivably engaged by the internal spline teeth on clutch element 258 when the clutch element 258 is adjusted in a left hand direction. This establishes a direct driving connection between gear 266 and counter shaft 122. The gears 232 and 250, the clutch element 254 and gear 256 are situated in axially stacked relationship between intermediate portion 226 of counter shaft 122 and bearing adapter 130 and suitable thrust washers may be provided between these members as indicated.

During operation in the sixth speed ratio, clutch element 258 is shifted in a left hand direction as viewed in FIG. 1 and clutch disc assembly 186 and 192 is released while clutch disc assembly 216 and 220 is applied. The torque delivery path between power input gear 170 and the power output shaft 118 during operation in the sixth speed ratio is defined by gear 172, gear 144, sleeve shaft 140, clutch disc assembly 216 and 220, counter shaft 122, clutch elements 254 and 258, gear 266 and gear 264.

As previously indicated, a gear 148 is secured to one end of power output shaft 118, and this gear 148 is situated in driving engagement with a gear 270 which is rotatably mounted on a bearing adapter 272 by means of a roller bearing 274. Bearing adapter 272 is in turn secured within a cooperating aperture formed in end wall 162 of housing 24. Bearing adapter 272 also receives the right end of counter shaft 120.

A drum-shaped clutch member 276 is secured to gear 270 by means of bolts 278 and it is adapted to rotate conjointly therewith. The radially inward end of clutch member 276 is piloted within the bearing adapter 272. A supporting shaft 280 is received within the bearing adapter 272 in coaxial relationship with respect to counter shaft 120 and it also extends through a gear 282 situated on the right side of the main transmission gear assembly. Suitable needle bearings are provided, as shown at 284 and 286, to accommodate relative rotation between gear 282 and shaft 280, and the gear 282 is in turn supported by a roller bearing 288. Bearings 288 are received within bearing openings formed in an end plate 290 which forms a part of housing 24. A suitable cap 292 can be provided if desired for the purpose of covering the bearing 288.

A clutch member 294 is integrally joined to gear 282 and is externally splined so that cooperating internally splined clutch discs 296 can be carried thereon.

The clutch member 276 includes an outer peripheral portion 298 which is internally splined so that externally splined clutch discs 300 can be carried thereby, and a clutch disc backup member is carried by the peripheral portion 298 as shown at 302.

The clutch member 276 and the shaft 280 cooperate to define an annular working cylinder 304 within which an annular piston 306 is slidably situated. When fluid pressure is admitted into the cylinder 304 the clutch discs 296 and 300 are urged into frictional engagement, thereby establishing a driving connection between gear 270 and gear 282. Piston 304 is urged toward a retracted position by means of a piston return spring 308 which is seated on a spring seat member 310. Seat member 310 may in turn be anchored against a cooperating shoulder formed on shaft 280. The clutch member 270 may be suitably keyed or otherwise secured to the shaft 280 in the vicinity of the bearing adapter 272, and the end of shaft 280 may be threaded to accommodate a locking nut 312.

If desired, a ball check pressure relief valve 314 may be provided in clutch member 276 at a radially outward location in order to prevent a buildup in centrifugal pressure within the cylinder 304 when the low speed steering clutch 14 is released. This valve also provides a rapid exhaust of fluid from the cylinder 304 when release of the clutch 14 is initiated.

Gear 148 is also in driving engagement with a gear 316 which in turn is mounted on a bearing adapter 318 by means of a roller bearing 320. The high speed steering clutch 18 is similar in construction to the above described low speed steering clutch 14 and it includes a drum-shaped clutch member 322 secured to gear 316 by bolts 324 for conjoint movement therewith. A supporting shaft, similar to the previously described shaft 280, is provided at 324 and a gear 326 is mounted about shaft 324. Gear 326 is rotatably journalled by means of a roller bearing 328, and bearing 328 is in turn secured within a suitable bearing aperture formed in end plate 290. A suitable cover or cap 330 may be used for covering bearing 328.

Bearings 332 and 334 may be used to accommodate relative rotation between gear 326 and shaft 324. A clutch member 336 is carried by gear 326 and it is externally splined so that internally splined clutch discs 338 can be carried thereby. Clutch member 332 may be internally splined to accommodate a connection with externally splined clutch discs 340. The clutch member 322 and shaft 324 cooperate to define an annular cylinder 342 within which an annular piston 344 is slidably situated. When fluid pressure is admitted into the cylinder 342, the piston 344 urges the clutch discs 338 and 340 into frictional engagement to establish a driving connection between gears 316 and 326.

The low speed steering clutch 16 and the high speed steering clutch 20 are located on the left side of the assembly as viewed in FIG. 1, and they correspond in structure and function to clutches 14 and 18, respectively. Accordingly, the individual components of the clutches 16 and 20 are identified in FIG. 1 by primed reference numerals which correspond to those members which form a counterpart thereof in steering clutches 14 and 18. The power delivered to gear 146 by shaft 118 is therefore transmitted directly to either of the gears 270′ and 316′. When the multiple clutch disc assembly for steering clutch 16 is applied, a driving connection is established between gear 270′ and gear 282′; and in a similar fashion, when the multiple clutch disc assembly for the high speed steering clutch 20 is energized, a driving connection is established between gear 316′ and gear 326′. The manner in which the various high speed and low speed steering clutches are applied and the operating sequence thereof will become apparent from the subsequent description of the control system as illustrated in FIGS. 4 and 4a.

Referring next to FIG. 2 we have illustrated a power output gear at 346, and it is formed with an elongated hub 48 which is rotatably supported by spaced roller bearings 350 and 352. Bearings 350 and 352 are in turn positioned within suitable bearing apertures formed in end wall 290′ of housing 26 and in a housing portion 354. The hub 348 is internally splined and is positively engaged with an externally splined power output member 356. The member 356 is formed with a radially extending disc portion 358 which in turn is externally splined as shown at 360 to facilitate a driving connection with a brake disc 362. A power delivery connection between member 356 and the vehicle traction wheels or tracks may be formed in any suitable manner; and if desired, an intermediate final drive mechanism may be employed to provide an additional torque multiplication for additional tractive effort.

An adapter 364 is secured within the hub 348 of gear 346 and it may be pinned or otherwise positively connected to gear 346. A fluid pump 366 for the control system may be mounted externally of the transmission housing in the vicinity of gear 346, and the power input shaft for pump 366 may be keyed or otherwise connected to adapter 364 as shown at 368. The fluid pressure manifold for pump 366 is shown at 370 and suitable transmission mounting structure is shown at 372.

A disc brake assembly is generally designated in FIG. 2 by numeral 374 and it comprises a generally cylindrical brake housing 376 suitably secured to end plate 290′ by bolts 378, the housing 376 being suitably flanged to facilitate such a connection. The housing 376 is formed with a transverse opening 380 within which brake disc 362 is received, as will be subsequently explained with reference to the schematic drawings of FIGS. 4 and 4a.

The brake assembly 374 includes a fluid pressure operated brake piston shown in part in FIG. 1 at 382. The brake assembly 374 further includes a friction member 384 situated adjacent one side of the brake disc 362. When the brake assembly 374 is pressurized, piston 382 is urged into frictional engagement with brake disc 362 and a braking effort is thus applied to brake disc 362. A portion of the fluid pressure passage which is used for pressurizing the fluid pressure working chamber of the brake assembly 374 is shown in FIG. 2 at 386. This passage 386 forms a portion of the control system which will be described with reference to FIGS. 4 and 4a.

A second brake assembly is shown in FIG. 2 at 388 and it is similar in construction to the above described brake assembly 374. An opening 390 is formed in the housing for brake assembly 388 and the brake disc 362 is received therein. The brake assembly 388 also includes a pressure operated piston which is adapted to exert a frictional braking force on brake disc 362 in a fashion similar to the operation of brake assembly 374.

A second pair of disc brake assemblies are situated on the right side of the transmission assembly, as viewed in FIG. 2, and these brake assemblies are identified by the numerals 392 and 394. A brake disc is shown at 396 and it acts in cooperation with the brake assemblies 392 and 394 in the manner previously described. The brake disc 396 is positively connected to a power output gear (not shown) which is similar in function to power output gear 346 and mounted in driving engagement with gears 326 and 282.

Referring again to FIG. 1, the splined clutch elements 236 and 240 form a portion of a synchronizer assembly which provides synchronized engagement between clutch member 240 and either one or the other of the gears 260 or 244. The synchronizer assembly includes a plurality of blocker shafts 398, each shaft 298 being situated within a cooperating opening formed in clutch element 240. The ends of each shaft have secured thereto cone clutch members 400 and 402 which are adapted to cooperate with cone clutch surfaces formed on gears 260 and 244, respectively. When the clutch element 240 is in the intermediate or neutral position, as shown in FIG. 1, clearance exists between shafts 398 the cooperating openings formed in the element 240.

When it is desired to couple gear 260 with counter shaft 120 under those conditions in which a speed differential exists therebetween, the clutch element 240 may be urged in a left hand direction as viewed in FIG. 1. A blocker shoulder on shaft 398 will then be brought into engagement with a cooperating shoulder formed on the clutch element 240. The shifting force which is applied to the clutch element 240 will therefore be transferred through shaft 398 to clutch member 400, thereby causing a clutching engagement with gear 260. The rotary motion of gear 260 will therefore be transferred through the synchronizer assembly to counter shaft 120 thereby causing the latter to accelerate. After the counter shaft 120 and the gear 260 assume a synchronous speed, clutching engagement between clutch member 240 and clutch teeth 262 will become feasible and the shafts 398 will become centered in the cooperating openings formed in clutch member 240 so that the cooperating blocker shoulders on the shafts 398 and the clutch element 240 will no longer engage each other. The clutch element 240 may then be shifted to its left hand position into engagement with clutch teeth 262. The synchronizer assembly thereby eliminates a clashing of the clutch teeth.

In a similar fashion when clutch element 240 is shifted in a right hand direction to effect third speed operation, the counter shaft 120 may be brought into synchronism with respect to gear 244 before the clutch element 240 drivably engages the clutch teeth 242. In this case a second blocker shoulder formed on shafts 398 prevents movement of the clutch element 240 in a right hand direction when the shafts 398 are misaligned with respect to the cooperating openings due to a difference in the speeds of rotation of counter shaft 120 and gear 244. The shifting effort applied to clutch element 240 is transmitted through shafts 398 to clutch member 402, and when a synchronous speed is obtained, the shafts 398 will permit the clutch element 240 to be moved to its extreme right hand position.

A similar double acting synchronizer assembly is provided for gears 266 and 250 to effect a synchronized shift to condition the transmission for either sixth speed operation or fourth speed operation. Similarly, a single acting synchronizer assembly is provided for gears 200 and 232 to provide a synchronized driving connection between counter shaft 120 and gear 200 and between counter shaft 122 and gear 232 when the transmission is conditioned for first speed operation or second speed operation, respectively.

*Operation of the transmission structure of FIG. 1*

To obtain first gear operation, the gear 200 is clutched to counter shaft 120 as previously explained, and the clutch disc assembly 186 and 192 is applied. Torque is then delivered through gears 170 and 174, through clutch disc assembly 186 and 192, through counter shaft 120 and through gears 200 and 204 to the power output shaft 118. When it is desired to condition the transmission for second speed operation, gear 232 may be clutched to counter shaft 122 while power is still being delivered through counter shaft 120. In order to complete the transition from first speed operation to second speed operation it is then merely necessary to disengage clutch disc assembly 186 and 192 and to conjointly apply clutch disc assembly 216 and 220. The control system hereinafter described is arranged so that a desired amount of overlap may be obtained during the disengagement of clutch disc assembly 186 and 192 and the application of clutch disc assembly 216 and 220, and a smooth transition from the first speed ratio to the second speed ratio is thus accomplished without an interruption in the power delivery to the output shaft. The torque delivery path during operation in second speed is thus defined by gear 172, clutch disc assembly 216 and 220, counter shaft 122 and the gears 232 and 204, and no power is transferred through counter shaft 120.

When a shift from the second speed ratio to the third speed ratio is desired, gear 244 may be clutched to counter shaft 120 by its associated spline clutch while power is being transferred through counter shaft 122. In order to complete the transition from second speed operation to third speed operation, it is merely necessary to disengage clutch disc assembly 216 and 220 and to conjointly engage clutch disc assembly 186 and 192. Again, the control system is capable of sequentially operating the clutch disc assemblies for the respective counter shafts to provide a smooth transition from one speed ratio to another without any interruption in the power delivery path.

In a similar fashion the transmission may be conditioned for fourth speed operation by clutching the gear 250 to counter shaft 122 by means of its associated spline clutch while power is being delivered through the counter shaft 120. The transition from third speed ratio to fourth speed ratio may then be completed by sequentially disengaging the clutch disc assembly for counter shaft 120 and applying the clutch disc assembly for counter shaft 122. It is thus apparent that counter shaft 120 no longer forms a part of the power delivery path during operation in the fourth speed ratio.

In order to initiate a shift from fourth speed ratio to fifth speed ratio, gear 260 is clutched to counter shaft 120 as previously described while counter shaft 122 is still in the power delivery path. The clutch disc assembly for counter shaft 120 is then applied in sequence with the disengagement of the clutch disc assembly for counter shaft 122. After the shift is completed, counter shaft 122 no longer forms a portion of the power delivery path.

A shift from fifth speed ratio to the sixth speed ratio may be accomplished by clutching gear 266 to counter shaft 122 while power is being delivered through counter shaft 120. The clutch disc assemblies for countershafts 122 and 120 may then be sequentially applied and released, respectively, in the manner previously described.

During the above described sequence it is necessary to release the first speed synchronizer assembly before the third speed synchronizer assembly is actuated since both synchronizers cannot be simultaneously engaged. In a similar fashion the third speed synchronizer must be disengaged at a time prior to the engagement of the fifth speed synchronizer.

Since two of the synchronizers associated with counter shaft 122 cannot be applied simultaneously, provision is made for disengaging the second speed synchronizer prior to the engagement of the fourth speed synchronizer, and provision is also made for disengaging the fourth speed synchronizer prior to the engagement of the sixth speed synchronizer.

During operation of the transmission mechanism in the forward drive range as above described, power is delivered from the fluid coupling 12 to the power input gear 170 through the geared power flow path defined by gears 62, 76, 86, 88 and 104. The synchronizer clutch element 100, as shown in FIG. 3, in this instance establishes a driving connection between shaft 96 and bevel gear 88. The synchronizer mechanism associated with gears 88 and 90 is similar in construction and operation to the synchronizer mechanism for gears 260 and 244 which was previously described.

In order to condition the transmission mechanism for reverse drive operation, the synchronizer clutch element 100 may be shifted in a left hand direction, as viewed in FIG. 3, to establish a driving connection between gear 90 and gear 104. It is thus apparent that gear 104 will be driven in a reverse direction thereby making a reverse drive possible.

In the presently described embodiment of our invention the control system is adapted to cause application of the low speed steering clutches 14 and 16 during operation in reverse and in the first and second speed ratios while simultaneously disengaging the high speed steering clutches 18 and 20. The overall torque multiplication ratio during operation in reverse and in the first and second speed ratios is therefore at a maximum value. However, during operation in the third, fourth, fifth and sixth speed ratios, the low speed steering clutches 14 and 16 are released and the high speed steering clutches 18 and 20 are applied.

In this preferred embodiment, above described, we have obtained an overall torque multiplication ratio during first speed operation of 15.029:1 and the ratio for sixth speed ratio is an overdrive ratio of .958:1. The ratios for second, third, fourth and fifth speed operation are, respectively, 9.215:1, 4.124:1, 2.529:1, and 1.559:1. If the transmission structure is used in combination with a final drive mechanism, the gear ratio of the final drive mechanism would provide a further overall torque multiplication for each speed ratio.

*Description of control circuit of FIGS. 4 and 4a*

Referring next to FIGS. 4 and 4a, an engine driven front pump is shown at 404 and it is adapted to deliver control pressure to a pressure regulator valve 406. Also, the above mentioned power output shaft driven pump 366 is in fluid communication with the pressure regulator valve 406 through a main control pressure passage 408 which is common to both pumps 404 and 366.

The regulator valve 406 is located on the discharge side of the pump and it includes a multiple land valve spool 410 which is situated in a cooperating valve chamber and urged in a left hand direction, as viewed in FIG. 4, by an associated valve spring. A low pressure fluid exhaust passage is shown at 412 and a valve land 414 is adapted to control the degree of communication between the discharge side of the pump 404 and passage 412. A valve plunger 416 is situated in regulator valve 406 so that it contacts the valve spool 410, and one side thereof is subjected to the control pressure existing in passage 408. It is thus apparent that the spring force of the regulator valve spring will oppose and balance the fluid pressure force applied to the valve plunger 460, and the effectve discharge pressure of pump 404 will be regulated at a calibrated maximum value.

A one way check valve 418 is provided on the discharge side of pump 404, and a similar one way check valve 420 is provided on the discharge side of the output shaft driven pump 366. When the discharge pressure of the pump 404 exceeds the discharge pressure for pump 366, the check valve 418 will assume an open position and the check valve 420 will assume a closed position, and pressure regulation will take place in the manner previously described. However, when the discharge pressure for the pump 366 exceeds the discharge pressure for the pump 404, the check valve 420 will be opened and the check valve 418 will be closed. Passage 408 communicates with the regulator valve chamber at a location adjacent valve land 422, and the degree of communication between passage 408 and passage 412 is controlled by land 422. Under these conditions, the fluid pressure force acting on valve plunger 416 and the opposing spring force acting on valve spool 410 become rearranged so that the valve land 422 will assume a pressure regulating position. The pump 366 will then supply the entire pressure requirements of the control system, and the pump 404 will communicate directly with the exhaust passage 412 since valve land 414 will provide free communication between the high pressure and low pressure sides of pump 404 when the valve element 410 assumes this new regulating position.

The regulator valve 406 is also capable of controlling the distribution of fluid pressure to the fluid coupling 12, a valve land 424 being provided for this purpose. A fluid pressure passage extending to the fluid coupling 12 is uncovered by valve land 424 after the valve spool 410 assumes its normal regulating position. The regulator valve 406 therefore operates to supply the control system with full control pressure before it allows fluid pressure to be distributed to the fluid coupling. This feature is desirable since the transmission clutches will be capable of assuming their full torque transmitting capacities before full engine torque can be applied to the power input members of the gear assembly.

Fluid pressure is distributed from passage 408 to a manual valve through passage 426, the manual valve being identified in FIG. 4 by numeral 428. The manual valve 428 includes a multiple land valve spool slidably disposed in a cooperating valve chamber and it includes four spaced valve lands which are identified in FIG. 4 by numerals 430, 432, 434 and 436. A suitable mechanical linkage mechanism, generally identified by numeral 438, may be employed for adjusting the position of valve spool 428 to any of several operating positions depending upon the speed ratio which is desired. The individual operating positions of the valve spool 428 may be defined by a suitable spring detent as shown at 440. The manual valve is shown in FIG. 4 in the position corresponding to neutral, and detent recesses are formed in the manual valve at evenly spaced locations which correspond to the various speed ratios, the numerals 1 through 6 being used to identify each of the six speed ratio positions.

An internal passage is formed in valve spool 428 as shown at 422 for the purpose of establishing communication between the annular valve space defined by valve lands 430 and 432 and the annular space defined by valve lands 434 and 436. The principal components of the control system of FIGS. 4 and 4a which are utilized for the purpose of controlling the sequential shifts, as above described, include a first speed synchronizer servo 444, a second speed synchronizer servo 466, a third and fifth speed synchronizer servo 448 and a fourth and sixth speed synchronizer servo 450. In addition, a first clutch transition valve is shown at 452 which is effective to control the distribution of fluid pressure to the multiple clutch disc assembly 186 and 192. For purposes of convenience this clutch disc assembly will hereinafter be referred to as the $C_1$ clutch and the transition valve 452 associated therewith will be referred to as the $C_1$ transition valve. A transition valve is also provided at 454 for the purpose of controlling the distribution of fluid pressure to the clutch disc assembly 216 and 220. For the purpose of convenience the clutch disc assembly 216 and 220 will hereinafter be referred to as the $C_2$ clutch and the transition valve 454 associated therewith will be referred to as the $C_2$ transition valve.

In addition, we have provided a so called low range valve as shown at 456 for controlling the distribution of fluid pressure to the high steering clutch and the low steering clutch located on the right side of the transmission assembly as viewed in FIG. 1, and a similar low range valve is provided at 458 for controlling the distribution of fluid pressure to the corresponding steering clutches on the other side of the transmission assembly.

The first speed synchronizer servo 444 comprises a piston member 460 having a pair of spaced annular valve lands as shown at 462 and 464. The piston 460 is mounted within a cooperating cylinder and defines therewith a pair of opposed working chambers illustrated in FIG. 4a on the upper and lower sides of the piston 460, respectively. The piston 460 is mounted within a cooperating cylinder and defines therewith a pair of opposed working chambers illustrated in FIG. 4a on the upper and lower sides of the piston 460. The piston 460 may be mechanically connected by a suitable actuator rod 466 to a shifter fork which is adapted to engage the clutch element 198 of the first speed synchronizer when the piston 460 is urged in an upward direction, as viewed in FIG. 4a. The clutch element 198 is shifted into clutching engagement with clutch teeth 202 to establish a driving connection between counter shaft 120 and gear 200. The piston 460 is urged in a downward direction, as viewed in FIG. 4a, by a synchronizer servo spring.

The second speed synchronizer servo 446 is similar in construction to the first speed synchronizer servo 444 and it comprises a servo piston 470 situated in a cooperating servo cylinder to define a pair of opposed fluid pressure working chambers, said chambers being illustrated on the upper and lower sides of the piston 470 as viewed in FIG. 4. A pair of annular valve lands 472 and 474 is formed on the piston 470 and these valve lands correspond to the aforementioned valve lands 462 and 464 of the first speed synchronizer servo piston 460. The piston 470 is positively connected to a shifter fork 476 by means of an actuator rod 478, and the shifter fork in turn is adapted to move the aforementioned synchronizer clutch element 230 into and out of engagement with clutch teeth 234 whereby the gear 232 is selectively clutched to and declutched from counter shaft 122. The piston 470 is normally biased in a downward direction, as viewed in FIG. 4, so that clutch element 230 normally assumes a declutched position. However, when fluid pressure is admitted to the fluid pressure chamber on the lower side of the piston 470, the clutch element 230 is shifted into engagement with clutch teeth 234.

The third and fifth speed synchronizer servo 448 comprises a double acting piston 480 which cooperates with a servo cylinder to define a pair of opposed fluid pressure chambers on either side of the piston 480. A pair of synchronizer servo springs is provided for normally biasing the piston 480 toward a central neutral position. A pair of spaced valve lands is formed on piston 480 as shown at 482 and 484. The piston 480 is positively connected to a shifter fork 486 by means of an actuator rod 488 and the shifter fork 486 is in turn situated in engaged relationship with respect to clutch element 240 associated with gears 260 and 244. When fluid pressure is admitted to the lower side of the piston 480, the clutch element 240 will be shifted into engagement with clutch teeth 262 thereby coupling gear 260 to counter shaft 120, and when fluid pressure is admitted to the upper side of the piston 480 while the lower side thereof is exhausted, the clutch element 240 will engage clutch teeth 242 thereby coupling gear 244 to counter shaft 120.

The fourth and sixth speed synchronizer servo 450 is similar in form to the third and fifth speed synchronizer servo and it includes a double acting piston 490 on which is formed a pair of spaced valve lands 492 and 494. The piston 490 is likewise normally biased toward an intermediate neutral position by synchronizer servo springs as indicated.

The piston 490 is positively connected to a shifter fork 496 by means of actuator rod 498, and the shifter fork 496 is in turn situated in engaged relationship with respect to clutch element 258 associated with gears 266 and 250. When fluid pressure is admitted to the fourth and sixth speed synchronizer servo 450 on the lower side of piston 490 while the pressure chamber on the upper side thereof is exhausted, the clutch element 258 will establish a positive driving connection between gear 266 and counter shaft 122. However, when fluid pressure is admitted to the pressure chamber on the upper side of the piston 490 while the pressure chamber on the lower side thereof is exhausted, the clutch element 258 will establish a positive driving connection between gear 250 and counter shaft 122.

The $C_1$ transition valve 452 comprises a valve spool 500 having a pair of spaced valve lands 502 and 504. Also the $C_1$ transition valve includes a valve element 506 situated in the valve chamber occupied by valve spool 500. The $C_1$ transition valve is adapted to control the distribution of fluid pressure to the $C_1$ clutch in a manner hereinafter described, and it is normally biased in a right hand direction, as viewed in FIG. 4a, by a $C_1$ transition valve spring.

The $C_2$ transition valve is similar in construction to the above described $C_1$ valve and includes a valve spool 508 having a pair of spaced valve lands 510 and 512. Also a valve element 514 is situated in the valve chamber occupied by valve spool 508 and a synchronizer servo spring is provided as indicated for normally biasing the valve spool 508 in a left hand direction, as viewed in FIG. 4. The $C_2$ transition valve functions to control the distribution of fluid pressure to the $C_2$ clutch in a manner which will hereinafter be described.

The low range valve 456 comprises a valve spool 516 having three spaced valve lands 518, 520 and 522. Valve spool 516 is normally urged in an upward direction, as viewed in FIG. 4a, by a low range valve spring and a fluid pressure chamber is formed on the upper side of valve spool 516 within the cooperating valve chamber in which valve spool 516 is situated. As previously mentioned, the low range valve 456 is adapted to control the distribution of control pressure to the high and low speed steering clutches, and it is also effective to control the distribution of a modulated fluid pressure to the disc brake assemblies 392 and 394. However, for purposes of convenience, only the disc brake assembly 392 has been illustrated in FIG. 4a.

The low range valve 458 is similar in form to the above described valve 456 and it comprises a valve spool 524 having three spaced valve lands 526, 528 and 530. Valve spool 524 is normally urged in an upward direction, as viewed in FIG. 4, by a low range valve spring and a fluid pressure chamber is defined by the valve spool 524 and the cooperating valve chamber on the upper side of the valve land 526. As previously mentioned, the low range valve 526 is effective to control the distribution of control pressure to the high and low speed steering clutches on the left side of the gear assembly of FIG. 1, and it is also effective to control the distribution of a modulated fluid pressure to the disc brake assemblies 374 and 388. However, for purposes of convenience, only the brake assembly 374 has been illustrated in FIG. 4.

When the manual valve assumes the neutral position illustrated in FIG. 4, control pressure is distributed to the annular space in the manual valve chamber between valve lands 430 and 432 through the aforementioned passage 426 and a passage 532. This control pressure is then conducted through internal passage 442 and through the annular space defined by valve lands 434 and 436 to a passage 534 communicating with the manual valve chamber. Passage 534 extends through a so-called neutral valve, identified in FIG. 4 by numeral 536, to one side of the valve element 506 in the $C_1$ transition valve.

This causes the C₁ transition valve to assume a left hand position, as viewed in FIG. 4a, so that valve land 504 blocks pressure passage 538 which communicates with passage 426. Communication between passage 538 and a passage 540 is thereby interrupted. The passage 540 communicates with the C₁ transition valve chamber at a location intermediate valve lands 502 and 504, and it also communicates with the C₂ transition valve chamber at a location on the left hand side of valve spool 508. Passage 540 also communicates with the C₁ clutch through a passage 542, as indicated.

The neutral valve 536 also establishes communication between passage 532 and a passage 544, the latter extending to a fluid pressure chamber on the lower side of the first speed synchronizer servo piston 460 and to the C₁ transition valve chamber on the left side of the C₁ transition valve spool 500. Communication is also established between the passage 546 through the neutral valve 536, and the passage 546 extends to the transition valve chamber on the left side of valve element 514. The valve spool 508 is thereby urged in a right hand direction, as viewed in FIG. 4, and valve land 510 is effective to block passage 548 which extends to the main control pressure passage 408. Communication is thereby interrupted between passage 548 and the passage 550, the latter communicating with the C₂ transition valve chamber at a point intermediate valve lands 510 and 512. Passage 550 also communicates with the C₁ transition valve chamber at a location on the right hand side of valve spool 500 as illustrated in FIG. 4a. Passage 550 is also effective to distribute control pressure to the C₂ clutch through a branch passage 552.

In addition, the manual valve establishes fluid communication between passages 532 and the passages 554 and 556 when it assumes the neutral position shown in FIG. 4, passage 554 extending to the pressure chamber on the upper side of the low range valve 458 and the passage 556 extending to the pressure chamber on the upper side of the low range valve 456. Control pressure passage 408 communicates with low range valve 456 at a location adjacent valve land 522, and when valve spool 516 is in the position shown, communication is established between passage 408 and the passage 555, passage 555 in turn communicating with the passage 557 through a low range steering transition valve 558. The passage 556 in turn communicates with the low steering clutch 14. In a similar fashion passage 408 communicates with the passage 560 through the low range valve 458 when the low range valve 458 assumes the position shown in FIG. 4. The passage 560 in turn is adapted to communicate with the passage 562 through a low range steering transition valve 564, and the passage 562 in turn communicates with the low range steering clutch 16.

The low range steering transition valve 564 includes a valve spool 566 having a pair of spaced valve lands 568 and 570. The valve spool 566 is normally urged in an upward direction, as viewed in FIG. 4, by a transition valve spring. A fluid pressure chamber is located on the upper side of the valve spool 566 within the associated valve chamber.

The low range steering transition valve 558 is similar in form and function to transition valve 564 and it also includes a valve spool 572 having a pair of spaced valve lands 574 and 576. Valve spool 572 is normally urged in an upward direction, as viewed in FIG. 4a, by an associated transition valve spring, and a fluid pressure chamber is situated on the upper side of the transition valve spool 572 within the associated valve chamber.

A high range steering transition valve for the high range steering clutch 18 is shown at 578 and it includes a valve spool 580 slidably disposed in a cooperating valve chamber. Valve spool 580 includes a pair of spaced valve lands 582 and 584 and it is normally urged in a downward direction, as viewed in FIG. 4a, by an associated transition valve spring. Main control pressure passage 408 communicates with the transition valve 578 adjacent valve land 584 and a passage 586 extends from the high range steering clutch 18 to the valve chamber associated with transition valve 578 at a location intermediate valve lands 582 and 584.

A high range transition valve is also provided for the high range steering clutch 20, as shown at 588, and it also includes a valve spool 590 having a pair of spaced valve lands 592 and 594. Valve spool 590 is normally urged in a downward direction, as viewed in FIG. 4, by an associated transition valve spring and a pressure chamber is located in the valve chamber for transition valve 588 on the lower side of valve spool 590, as viewed in FIG. 4. This pressure chamber for the transition valve 588 communicates with the valve chamber for the transition valve 564 at a location adjacent valve land 568, passage 596 being provided for this purpose. In a similar fashion the pressure chamber on the lower side of valve spool 580 for the transition valve 578 communicates with the valve chamber for the transition valve 558 at a location adjacent valve land 574, passage 598 being provided for this purpose.

A pair of steering valves is shown at 600 and 602, the former being used to control the operation of the steering clutches 16 and 20 and disc brake assemblies 374 and 388 and the latter being adapted to control the operation of the steering clutches 14 and 18 and the disc brake assemblies 392 and 394. Steering valve 600 includes a valve spool 604, having a pair of spaced valve lands 606 and 608, which is slidably received in a cooperating valve chamber. Valve spool 604 is adapted to be urged in a downward direction, as viewed in FIG. 4, by means of a personally operable steering linkage mechanism schematically designated by numeral 610, and a resilient spring connection is provided between valve spool 604 and linkage mechanism 610.

Main control pressure passage 408 communicates with steering valve 600 at a location adjacent valve land 608 and a modulated steering pressure passage 612 communicates with the valve chamber for the steering valve 600 at a location intermediate valve lands 606 and 608. Passage 612 in turn communicates with the low range valve 458 at a location adjacent valve land 528, and when the low range valve spool 524 assumes a downward position, as illustrated in FIG. 4, communication is established between the passage 612 and the passage 614, the latter communicating with the pressure chamber on the upper side of transition valve spool 566 and with a clutch-brake steering cylinder 616. The steering cylinder 616 is associated with disc brake assemblies 374 and 388 and it includes a brake piston which may be mechanically coupled to a piston 618 for a disc brake master cylinder shown at 620, a suitable linkage 622 being provided for this purpose. When piston 618 is moved in a left hand direction, as viewed in FIG. 4, fluid pressure is introduced into a working chamber 624 situated on one side of the aforementioned disc brake piston 382. The passage interconnecting working chamber 624 with the master cylinder 620 was previously identified in the description of FIG. 2 by numeral 386, and this numeral is used to illustrate the corresponding passage in FIG. 4.

When the valve spool 524 for the low range valve 458 assumes an upward position, passage 612 is brought into communication with passage 560 and passage 614 is exhausted through the exhaust port associated with the low range valve 458. The low range steering transition valve 564 will then assume an upward position under the influence of spring pressure, and the modulated steering pressure in passage 612 will therefore be transmitted through passage 560 to the low range steering clutch 16 through passage 562 and to the pressure chamber on the lower side of transition valve spool 590 through passage 596.

The steering valve 602 for the steering clutches 14 and 18 and for the disc brake assemblies 392 and 394 also comprises a valve spool 626 having a pair of spaced valve lands 628 and 630. Control pressure passage 426 communicates with the valve chamber for steering valve 602 at a location adjacent valve land 630, and a passage 632 communicates with the steering valve 602 at a location intermediate valve lands 628 and 630. Passage 632 in turn communicates with a passage 634 through the low range valve 456 when the low range valve spool 516 assumes a downward position, as illustrated in FIG. 4a. Passage 634 in turn communicates with one side of a clutch-brake steering cylinder 636 which corresponds to the aforementioned steering cylinder 616. A movable piston is situated in steering cylinder 636 and it is mechanically coupled to a piston 638 disposed in a disc brake master cylinder 640. When the piston 638 is urged in a right hand direction, fluid pressure is transferred to the disc brake assemblies 392 and 394 through the passage 642.

When the low range valve assumes an upward position, as viewed in FIG. 4a, communication is established between passage 632 and passage 554, and the valves 456, 558 and 578 mutually cooperate in a manner similar to the mode of cooperation between the above described valves 458, 564 and 588.

The steering valve 602 may be operated by the vehicle operator by means of a mechanical steering linkage mechanism shown schematically at 644, and when it is desired to produce a modulated steering pressure in passage 632, the valve spool 626 may be urged in a downward direction by linkage mechanism 644. A suitable resilient spring connection between the valve spool 626 and linkage mechanism 644 is provided for this purpose. The modulated steering pressure thus produced in passage 632 is transmitted to the lower end of the steering valve 602 so that the steering pressure produced is utilized to oppose the manual effort applied by the linkage mechanism 644. It is thus apparent that the magnitude of the modulated steering pressure made available to the steering clutches and brake assemblies on the right side of the transmission assembly is under the direct control of the vehicle operator.

In a similar fashion the modulated steering pressure produced by steering valve 600 in passage 612 is conducted to the lower side of the steering valve 600 and utilized to oppose the manual effort applied to the valve spool by linkage mechanism 610. A forward and reverse valve is shown at 646, and it comprises a multiple land valve spool 648 slidably disposed in the cooperating valve chamber. The upper end of the valve chamber for valve 646 communicates with the manual valve 428 through passage 649 at a location adjacent valve land 430. Valve spool 646 is adapted to control the distribution of fluid pressure to either one side or the other of a double acting reverse gear synchronizer servo shown at 650. When the valve spool 648 assumes the position shown in FIG. 4, pressure is distributed to the upper side of the servo 650 thereby urging an associated servo piston 652 in a downward direction. This causes a shifting movement of an associated shifter fork 654, thereby effecting a direct drive connection between bevel gear 88 and gear 104. However, when valve spool 648 assumes a downward position, fluid pressure is conducted to the lower side of the servo 650 thereby urging piston 652 and shifter fork 654 in an upward direction to provide a driving connection between bevel gear 90 and gear 104. When one side of the servo 650 is thus pressurized, the opposite side thereof is exhausted through the valve 648.

*Description of operation of the transmission control valves of the circuit of FIGS. 4 and 4a*

The control circuit of FIGS. 4 and 4a is represented schematically, and the various valve elements thereof may be located in a valve body in the transmission housing. For purposes of convenience, the clutch disc assembly 186 and 192 will be referred to as the $C_1$ clutch, the clutch disc assembly 216 and 220 will be referred to as the $C_2$ clutch, the brake assemblies 392 and 394 will be referred to as the $B_1$ brake, the brake assemblies 374 and 388 will be referred to as the $B_2$ brake, the clutch 14 will be referred to as the right low steering clutch, the clutch 16 will be referred to as the left low steering clutch, the clutch 18 will be referred to as the right hi steering clutch, and the clutch 20 will be referred to as the left hi steering clutch.

By preference, the control circuit includes four hydraulic pumps and two of these are driven by the engine and the other two are driven by the power output members. The engine driven pumps will be collectively referred to in the subsequent description as the front pump, and the pumps driven by the power output member will be collectively referred to as the rear pump. One of the engine driven pumps is used for the purpose of scavenging the fluid coupling housing and for circulating the oil in the hydrokinetic circuit through a heat exchanger, and the other is used for supplying transmission control pressure.

The front and rear pumps are arranged so that either the front pump or the rear pump may supply the fluid pressure requirements of the control circuit depending upon the speed ratio in which the transmission is operating and the operating vehicle speed in that ratio. The discharge side of the front pump is directly connected to the main pressure regulator valve at a location adjacent valve land 414 so that the degree of communication between the discharge side of the front pump and the low pressure exhaust passage 412 is controlled by valve land 414. The pressure is then distributed to main control pressure passage 408 through one way check valve 418. The left side of valve plunger 416 is subjected to the control pressure in passage 408 thereby creating a valve biasing force which tends to increase the degree of communication between the discharge side of the front pump and passage 412. This pressure force is opposed by the pressure regulator valve spring force. It is therefore apparent that the pressure regulator valve will assume a balanced condition, and the control pressure in passage 408 will be regulated at a substantially constant value depending upon the calibration of pressure regulator valve.

If it is assumed that the capacity of the rear pump for any given operating speed is less than the capacity of the front pump check valve 420 will assume a closed position and the front pump will supply the entire pressure requirements of the circuit. However, under those conditions in which the capacity of the rear pump is equal to or greater than the capacity of the front pump, the regulator valve spool will assume a new balanced position and valve land 422 will control the degree of communication between passage 408 and the exhaust passage 412, the check valve 418 being closed and the check valve 420 being opened. A fluid pressure force is also applied to plunger 416 under these conditions to oppose and balance the regulator valve spring force. When the regulator valve operates in this fashion, the rear pump supplies the entire pressure requirements of the circuit and the front pump operates with a substantially zero head since valve land 414 is moved to a wide open position when regulation takes place at valve land 422. This reduces unnecessary horsepower loss.

Valve land 424 of the regulator valve controls the distribution of fluid pressure to the fluid coupling 12, as indicated. The regulator valve is arranged so that if the operating control pressure is reduced below a desired normal value, the valve 424 will completely interrupt the distribution of fluid pressure to the coupling 12. Full control pressure is therefore supplied to the control circuit immediately after the engine has been started and before the coupling is filled, and maximum oil pressure is therefore made available to the transmission clutches before the transmission is conditioned for torque delivery.

The elements of the control circuit of FIGS. 4 and 4a have been illustrated in the neutral position. It will be apparent that control pressure is distributed directly from passage 408 to the manual valve at a location intermediate valve lands 430 and 432. The position of the manual valve spool may be controlled, as previously explained, by means of a driver operated mechanical linkage 438. When the manual valve assumes the neutral position illustrated in FIG. 4, control pressure is distributed through passage 442 to passage 534, the latter extending to the right side of valve element 506 of the $C_1$ transition valve. Control pressure is also distributed from passage 544 to passage 546 through the neutral valve, and the passage 546 in turn distributes pressure to the left hand side of the $C_2$ transition valve element 514. Control pressure is also distributed by the manual valve to passage 556 which in turn extends to the upper end of the low range valve spool, the latter thereby being urged in a downward direction against the opposing force of the low range valve spring.

Control pressure is also distributed to the upper side of the reverse gear synchronizer servo thereby shifting the shifter fork 654 so that the turbine member of the fluid coupling will be positively connected to gear 104 through gears 88, 86, 76 and 62.

When the manual valve is in the neutral position, the $C_1$ transition valve and the $C_2$ transition valve are urged in a lefthand direction and in a right hand direction, respectively, and the $C_1$ clutch and the $C_2$ clutch are therefore both exhausted through the exhaust port associated with their respective transition valves. The first speed synchronizer servo piston thus assumes a clutching position thereby clutching gear 200 to countershaft 120. Although the first speed synchronizer servo is applied, the transmission is not conditioned for torque delivery since both of the power output clutches $C_1$ and $C_2$ are disengaged.

If it is now assumed that the manual valve spool is shifted to a reverse position in a downward direction, passage 534 will become exhausted and fluid pressure will then be exhausted from the right side of the $C_1$ transition valve element 506. The $C_1$ transition valve spool will therefore assume a right hand position, and passage 540 will therefore communicate directly with passage 538 thereby permitting control pressure to pass directly to the $C_1$ clutch. The same control pressure is also distributed through passage 540 to the left side of the $C_2$ transition valve spool.

When the manual valve spool assumes the reverse position, valve land 430 directs fluid pressure through passage 649 to the forward and reverse valve thereby shifting the latter in a downward direction. Control pressure is therefore distributed to the lower end of the reverse gear synchronizer servo and the upper end of the servo is simultaneously exhausted. The shifter fork 654 is therefore shifted so that the turbine of coupling 12 is connected to gear 104 through gears 90, 86, 76 and 62, the gear 104 therefore being conditioned for reverse drive operation. Since the first speed synchronizer servo and the $C_1$ clutch are both simultaneously engaged, the transmission mechanism is conditioned for torque delivery and a reverse drive is thus accomplished. It will be observed that the low range valve continues to assume the downward position so that control pressure may be distributed therethrough to passage 555 which in turn communicates with the low steering clutches.

If it is now assumed that the manual valve spool is shifted in an upward direction through the neutral position to the first speed position, fluid pressure distribution to the upper end of the forward and reverse valve will be interrupted and this valve will assume the position shown in FIG. 4. The reverse gear synchronizer servo will therefore assume the forward drive position previously described. Also passage 534 will again be exhausted through the manual valve, and this in turn exhausts fluid pressure from the right side of the $C_1$ transition valve element 506. Fluid pressure continues to be supplied to the lower end of the first speed synchronizer servo piston and to the left side of the $C_1$ transition valve spool. Fluid pressure also continues to be supplied to the upper ends of both of the low range valves. It is therefore apparent that control pressure will be supplied to the low range steering clutches and to the $C_1$ clutch while the remaining clutches are disengaged. The transmission mechanism is therefore conditioned for first speed operation as previously described.

If it is now assumed that the manual valve spool is shifted in an upward direction to the second speed position, control pressure will be distributed through passage 442 of the manual valve to the passage extending to the lower end of the second speed synchronizer servo piston. Valve land 430 will therefore block distribution of fluid pressure to passage 544, and the fluid pressure distribution to the first speed synchronizer piston and to the $C_1$ transition valve spool will be interrupted. The right side of the $C_1$ transition valve element continues to be exhausted as it is during first speed operation.

The second speed synchronizer servo piston will therefore move in an upward direction as fluid pressure on the lower end thereof is built up and when the second speed synchronizer assumes an engaged condition. When this occurs, valve land 474 on the second speed synchronizer servo piston uncovers the associated passage extending to the right side of the $C_2$ transition valve spool thereby allowing control pressure to be distributed to the $C_2$ transition valve to urge the same in a left hand direction. This establishes communication between passages 548 and 550 thereby energizing the $C_2$ clutch. The fluid pressure on the left side of the $C_2$ transition valve element 514 is exhausted under these conditions since the associated passage 546, which communicates with passage 544, is exhausted as previously explained.

Control pressure is also distributed through passage 550 to the right side of the $C_1$ transition valve spool to urge the latter in a left hand direction thereby opening the $C_1$ clutch to exhaust. Fluid pressure also continues to be supplied to the upper end of the low range valves thereby causing fluid pressure to be distributed to each of the low steering clutches through their respective transition valves. Since the $C_2$ clutch and the second speed synchronizer are both applied, the transmission is conditioned for second speed operation, as previously explained.

If the manual valve spool is now shifted in an upward direction to the third speed position, valve land 430 interrupts the distribution of fluid pressure to the upper ends of the low range valves and fluid pressure on the lower side of the second speed synchronizer servo is exhausted through the manual valve. However, control pressure is distributed through passage 442 in the manual valve spool to the upper end of the third and fifth speed synchronizer servo thereby shifting the latter in a downward direction. This same fluid pressure is also transmitted to the upper end of the first speed synchronizer servo piston so that release of the first speed synchronizer is assured before the third speed synchronizer can be applied.

The valve land 482 on the third and fifth synchronizer servo piston uncovers the passage extending to the first speed synchronizer servo after the third and fifth speed synchronizer servo piston has shifted to an applied position so that control pressure is distributed to the left end of the $C_1$ transition valve spool. The $C_1$ transition valve spool is therefore shifted in a right hand direction thereby establishing communication between passage 538 and passage 540. The $C_1$ clutch is therefore energized and control pressure is again distributed through passage 540 to the left end of the $C_2$ transition valve spool. The $C_2$ transition valve spool therefore assumes a right hand position and the $C_2$ clutch is exhausted. Since the third speed synchronizer is engaged and since the $C_1$ clutch is applied, the transmission mechanism is conditioned for third speed operation. It should be noted, however, that the low range valves will assume an upward position since control pressure is no longer distributed to the upper ends thereof. The low range steering clutches will thus become exhausted through the low steering transition valves and through the low range valves, the associated exhaust port being located in the steering valves. Control pressure also is exhausted from the lower ends of the hi steering transition valves and each of these valves assumes a downward position under the influence of their associated valve springs. It is thus apparent that control pressure will be distributed to each of the hi steering clutches during third speed operation.

If the manual valve spool is now shifted to the fourth speed position, control pressure will be exhausted from the upper end of the third and fifth speed synchronizer servo piston and fluid pressure will concurrently be distributed to the upper end of the fourth and sixth speed synchronizer servo piston thereby urging the latter in a downward direction to effect engagement of the fourth speed synchronizer. After the fourth and sixth speed synchronizer servo piston assumes an engaged position, valve land 492 will uncover its associated passage to effect distribution of fluid pressure through the second speed synchronizer servo to the right side of the $C_2$ transition valve spool, the latter thereby being urged in a left hand direction. The $C_2$ clutch is therefore again applied and control pressure is again distributed through passage 550 to the right side of the $C_1$ transition valve spool. The $C_1$ transition valve spool therefore assumes a left hand position and the $C_1$ clutch is exhausted. Since the hi steering clutch, the $C_2$ clutch and the fourth speed synchronizer are concurrently applied in this fashion, the transmission mechanism is conditioned for fourth speed operation. It should be observed, however, that the control pressure which is distributed to the upper end of the fourth and sixth speed synchronizer servo piston is also distributed to the upper end of the second speed synchronizer servo piston so that disengagement of the second speed synchronizer is assured before the fourth speed synchronizer servo can be engaged.

If the manual valve spool is moved in an upward direction to the fifth speed position, the upper end of the fourth and sixth speed synchronizer servo piston is exhausted through the manual valve and control pressure is distributed to the lower end of the third and fifth speed synchronizer servo piston, the latter thereby being shifted in an upward direction to effect engagement of the fifth speed synchronizer. Since both the third and fifth speed synchronizers are operated by a common double acting synchronizer servo piston, the engagement of the third speed synchronizer is assured before the fifth speed synchronizer can be engaged.

When the third and fifth speed synchronizer servo piston assumes an engaged position, valve land 484 uncovers its associated passage to effect distribution of control pressure through the first speed synchronizer servo to the left side of the $C_1$ transition valve spool. The $C_1$ clutch therefore becomes applied and control pressure is again distributed through passage 540 to the left side of the $C_2$ transition valve spool. The $C_2$ transition valve spool is therefore shifted in a right hand direction to effect disengagement of the $C_2$ clutch. Since the hi steering clutch, the fifth speed synchronizer and the $C_1$ clutch are conjointly applied in this fashion, the transmission is conditioned for fifth speed operation.

When the manual valve spool is shifted in an upward direction to the sixth speed position, the lower end of the fifth speed synchronizer servo piston is exhausted through the manual valve and control pressure is distributed to the lower end of the fourth and sixth speed synchronizer servo piston, the latter thereby being shifted in an upward direction to effect engagement of the sixth speed synchronizer. Since the fourth and sixth speed synchronizers are both operated by a common double acting servo piston, disengagement of the fourth speed synchronizer is assured before the sixth speed synchronizer can be engaged. After engagement of the sixth speed synchronizer is completed, valve land 474 uncovers its associated passage to effect distribution of control pressure to the right side of the $C_2$ transition valve spool. The $C_2$ transition valve spool is therefore shifted in a left hand direction and the $C_2$ clutch becomes applied. Control pressure is again distributed through passage 550 to the right hand end of the $C_1$ transition valve spool thereby shifting the latter in a left hand direction to effect disengagement of the $C_1$ clutch. Since the hi steering clutch, the $C_2$ clutch and the sixth speed synchronizer are concurrently applied, the transmission is conditioned for sixth speed operation.

The transmission controls thus far described may be readily adapted to provide full range reverse operation by making an appropriate alteration in the forward and reverse valve. For example, this valve may be arranged so that it may be shifted to a reverse position and maintained in that position while the manual valve is shifted through the various speed positions. It is contemplated that a minimum of alteration would be required to incorporate such a full range reverse feature.

The neutral valve shown in FIG. 4 may be operated by means of the linking mechanism 438. According to a preferred arrangement, the mechanism 438 includes a manually operated lever which may be shifted in a fore and aft direction to accomplish the various speed changes, and when it is shifted in a transverse direction, the neutral valve is actuated. It will be apparent from an inspection of FIGS. 4 and 4a that the transmission will be conditioned for neutral whenever the neutral valve is shifted in a right hand direction since control pressure will be distributed to both the $C_1$ transition valve and the $C_2$ transition valve to maintain the same in their respective exhausted positions regardless of the position of the manual valve spool. It is therefore possible to shift the transmission from neutral directly into any of the several speed ratios.

*Operation of the steering control valves of the circuit of FIGS. 4 and 4a*

As previously pointed out in the above description of the transmission control valves, the low range valves assume a downward position during operation of the transmission in reverse, in neutral and in the first and second speed ratios. The low steering clutches are therefore engaged during operation in reverse and neutral and in the first and second speed ratios while the hi steering clutches are released. This provides a maximum degree of tractive effort. Turning maneuvers can be accomplished under these conditions by employing clutch-brake steering and the steering valves are effective to provide the necessary control. The right hi steering clutch, the right low steering clutch and brake $B_1$ may be independently controlled by steering valve 602, and the left hi steering clutch, the left low steering clutch and brake $B_2$ may be independently controlled by steering valve 600. For purposes of this description the steering valve 600 is illustrated in an applied position and steering valve 602 is illustrated in a fully released position.

Referring to FIG. 4, the steering valve spool 604 may be depressed by manually operated linkage mechanism 610 so that valve land 608 will provide controlled communication between passage 408 and passage 612. The resulting modulated pressure in passage 612 is conducted to the lower end of steering valve spool 604 thereby creating a pressure force which opposes and balances the steering valve spring force. The magnitude of the modulated pressure in passage 612 can therefore be controlled by the operator by appropriately positioning the steering linkage mechanism.

The modulated steering pressure is distributed through the low range valve during operation in reverse, neutral, first speed and second speed to the upper end of the low speed transition valve 564. When the modulated pressure is of a sufficient magnitude, low steering transition valve spool 566 assumes a downward position thereby exhausting the low steering clutch. The modulated steering pressure is applied to the clutch-brake steering cylinder 616 and this applies a disc braking force to the disc brake $B_2$ in the manner previously described.

If the steering valve 602 continues to assume the position shown in FIG. 4a, the right low steering clutch will remain applied. The turning radius can be controlled by the vehicle operator merely by controlling the position of the steering valve spool 604, and a large variety of turning radii may be produced. For example, a full pivot turn or a very gradual turn may be accomplished depending upon the magnitude of the steering pressure which is made available to brake $B_2$.

It will, of course, be understood that the steering valve 602 may operate in a manner similar to the above described operation of steering valve 600 to effect clutch-brake steering in the other direction.

If the transmission mechanism is operating in third, fourth, fifth, or sixth speeds, the low range valve will assume an upward position, as previously described, and the hi steering clutches are engaged while the low steering clutches are released. If it is desired to accomplish a turning maneuver under these conditions, the appropriate steering valve is operated in the fashion previously described to produce a modulated steering pressure in either passage 612 or passage 632.

If it is assumed that steering valve spool 626 is depressed by the vehicle operator, a modulated steering pressure will be distributed through the low steering transition valve to the lower end of the hi speed transition valve. When the modulated pressure is of a sufficient magnitude, the hi steering transition valve spool 580 will assume an upward position thereby causing the right hi steering clutch to become exhausted through the hi steering transition valve 578 while control pressure distribution to the right hi steering clutch is interrupted. The modulated steering pressure is distributed through the low steering transition valve 558 to the right low steering clutch thereby causing the associated track or traction wheel to operate at a slower speed than the track or traction wheel on the opposite side of the vehicle. The vehicle will therefore turn with a predetermined turning radius depending upon the relative gear ratios associated with the torque delivery paths through the hi and low steering clutches.

Having thus described a preferred embodiment of our invention, what we claim and desire to secure by United States Letters Patent is:

1. In a control system for a power transmission mechanism having engageable and releasable torque transmitting devices, separate fluid pressure operated servos adapted to actuate each device, a fluid pressure source, conduit structure including separate portions extending respectively from said source to each of said servos, first valve means disposed in and partly defining the conduit structure portion for one of said servos for distributing pressure to said one servo and exhausting the same, a signal pressure passage communicating with said first valve means and with a high pressure region of said conduit structure, second valve means disposed in and partly defining said signal pressure passage, said second valve means having movable portions connected to movable parts of another of said servos, the first valve means responding to a change in pressure in said other servo with a delayed action as pressure in said signal pressure is controlled upon movement of said other servo between two positions corresponding respectively to engaged and released positions of its associated torque transmitting device.

2. In a control system for a power transmission mechanism having engageable and releasable torque transmitting devices, separate fluid pressure operated servos adapted to actuate each device, a fluid pressure source, conduit structure including separate portions extending respectively from said source to each of said servos, first valve means disposed in and partly defining the conduit structure portion for one of said servos for distributing pressure to said one servo and exhausting the same, a signal pressure passage communicating with said first valve means and with a high pressure region of said conduit structure, second valve means disposed in and partly defining said signal pressure passage, said second valve means having movable portions connected to movable parts of another servo, distribution of pressure to said signal pressure passage being controlled by said other servo upon movement thereof between two positions corresponding respectively to engaged and released positions of its associated torque transmitting device, said other servo being double-acting and movable to each of said positions, said first valve means for said one servo responding to a pressure buildup in the other servo for controlling movement of said one servo to a device releasing position whereby actuation of said one servo is delayed until the other servo has assumed a disengaged position.

3. In a control system for a power transmission mechanism having engageable and releasable torque transmitting devices, separate fluid pressure operated servos adapted to actuate each device, a fluid pressure source, conduit structure including separate portions extending respectively from said source to each of said servos of said system, valve means disposed in and partly defining the conduit structure portion for one of said servos for distributing pressure to said one servo and exhausting the same, and a signal pressure passage communicating with said valve means and with a high pressure region of said conduit structure, said valve means responding to a change in pressure in another servo with a delayed action as pressure in said signal pressure passage is controlled upon movement of said other servo between two positions corresponding respectively to engaged and released positions of its associated torque transmitting device, said other servo and a third of said servos in said system having portions disposed in and partly defining said signal pressure passage, said other servo and said third servo being in fluid communication whereby one of them is urged to a device releasing position as the other is urged to its device engaging position.

4. In a control system for a power transmission mechanism having engageable and releasable torque transmitting devices, separate fluid pressure operated servos adapted for actuating each device, a fluid pressure source, conduit structure including separate portions extending respectively from said source to each of said servos, first valve means disposed in and partly defining the conduit structure portion for one of said servos for distributing pressure to said one servo and exhausting the same, a signal pressure passage communicating with said first valve means and with a high pressure region of said conduit structure, second valve means disposed in and partly defining said signal pressure passage, said second valve means having movable portions connected to movable parts of another servo of said separate servos, the first valve means responding to a change in pressure in said other servo with a delayed action as pressure in said signal pressure passage is controlled upon movement of said other servo between two positions corresponding respectively to engaged and released positions of its associated torque transmitting device, and personally operable selector valve means situated in and partly defining a portion of said conduit structure between said pressure source and said other servo whereby pressure can be distributed selectively to said other servo by appropriately manipulating said manual valve means.

5. In a control system for a power transmission mechanism having engageable and releasable torque transmitting devices, separate fluid pressure operated servos adapted to actuate each device, a fluid pressure source, conduit structure including separate portions extending respectively from said source to each of said servos, first valve means disposed in and partly defining the conduit structure portion for one of said servos for distributing pressure to said one servo and exhausting the same, a signal pressure passage communicating with said first valve means and with a high pressure region of said conduit structure, second valve means disposed in and partly defining said signal pressure passage, said second valve means having movable portions connected to movable parts of another servo of said separate servos, the first valve means responding to a change in pressure in said other servo with a delayed action as pressure in said signal pressure passage is controlled upon movement of said other servo between two positions corresponding respectively to engaged and released positions of its associated torque transmitting device, said other servo being double-acting and movable in each of said directions, said first valve means for said one servo responding to a pressure build up in said other servo for controlling movement of said one servo to a device releasing position, and personally operable selector valve means situated in and partly defining a portion of said conduit structure between said pressure source and said other servo whereby pressure can be distributed selectively to said other servo by appropriately manipulating said manual valve means.

6. In a control system for a power transmission mechanism having engageable and releasable torque transmitting devices, separate fluid pressure operated servos adapted to actuate each device, a fluid pressure source, conduit structure including separate portions extending respectively from said source to each of said servos, first valve means disposed in and partly defining the conduit structure portion for one of said servos for distributing pressure to said one servo and exhausting the same, a signal pressure passage communicating with said first valve means and with a high pressure region of said conduit structure, said first valve means responding to a change in pressure in another of said separate servos in said system with a delayed action as pressure in said signal pressure passage is controlled upon movement of said other servo between two positions corresponding respectively to engaged and released positions of its associated torque transmitting device, said other servo and a third servo of said separate servos in said system having portions disposed in and partly defining said signal pressure passage, said other servo and said third servo being in fluid communication whereby one of them is urged to a device releasing position as the other is urged to its device engaging position, and personally operable selector valve means situated in and partly defining a portion of said conduit structure between said pressure source and both said other servo and said third servo whereby pressure can be distributed selectively to said other servo and said third servo by appropriately manipulating said manual valve means.

References Cited by the Examiner
UNITED STATES PATENTS

| | | | |
|---|---|---|---|
| 1,646,552 | 10/27 | Mosel. | |
| 2,600,043 | 6/52 | Armitage et al. | 192—87 |
| 2,703,638 | 3/55 | Super | 192—87 |
| 2,824,632 | 2/58 | Lucia et al. | 192—3.2 |
| 2,958,231 | 11/60 | Gerst. | |
| 3,044,318 | 7/62 | Hardman. | |
| 3,059,740 | 10/62 | Roche | 192—3.2 |
| 3,059,746 | 10/62 | Christenson | 192—87 |
| 3,144,107 | 8/64 | Davies et al. | |

DAVID J. WILLIAMOWSKY, *Primary Examiner.*

DON A. WAITE, *Examiner.*